United States Patent [19]

Price et al.

[11] Patent Number: 4,880,681
[45] Date of Patent: Nov. 14, 1989

[54] LOW HEAT OUTPUT COMPOSITE

[75] Inventors: James O. Price, Auburn; Albert J. Stewart, Maple Valley; Sally A. Hasselbrack, Seattle, all of Wash.

[73] Assignee: Heath Tecna Aerospace, Co., Kent, Wash.

[21] Appl. No.: 160,528

[22] Filed: Feb. 26, 1988

[51] Int. Cl.$^4$ .................................................. B32B 3/12
[52] U.S. Cl. ............................ 428/116; 244/117 A; 524/416
[58] Field of Search ............... 428/116, 117, 118; 524/416; 244/117 R, 117 A

[56] References Cited

U.S. PATENT DOCUMENTS

| | | | |
|---|---|---|---|
| 2,477,852 | 8/1949 | Bacon | 428/116 |
| 3,658,579 | 4/1972 | Ottinger et al. | 428/292 |
| 3,939,107 | 2/1976 | Brown | 428/528 X |
| 3,981,832 | 9/1976 | Godfried | 428/417 X |
| 4,053,667 | 10/1977 | Smith | 428/116 X |
| 4,162,496 | 7/1979 | Downen et al. | 428/116 X |
| 4,251,579 | 2/1981 | Lee et al. | 428/73 |
| 4,299,872 | 11/1981 | Miguel et al. | 428/117 |
| 4,487,862 | 12/1984 | Maruya | 524/416 X |
| 4,500,582 | 2/1985 | King et al. | 428/116 |
| 4,514,328 | 4/1985 | Staendeke et al. | 428/921 X |
| 4,529,640 | 7/1985 | Brown et al. | 428/116 |
| 4,639,331 | 1/1987 | Elsner et al. | 524/416 X |
| 4,670,484 | 6/1987 | Fuchs et al. | 428/921 X |
| 4,680,216 | 7/1987 | Jacaruso | 428/116 |
| 4,729,303 | 3/1988 | Durbin | 428/116 X |

*Primary Examiner*—Henry F. Epstein
*Attorney, Agent, or Firm*—Christensen, O'Connor, Johnson & Kindness

[57] ABSTRACT

A fiber composite containing a system of reinforcing fibers that is impregnated with a resin matrix. The resin matrix includes a phenolic-based resin and a phosphorus-containing polymer. The composite exhibits low heat release rate and total heat release when subjected to combustion conditions including a radiant heat source.

21 Claims, 1 Drawing Sheet

LOW HEAT OUTPUT COMPOSITE

BACKGROUND OF THE INVENTION

The present invention relates to low heat output composites and composites exhibiting low flammability, particularly those composites used in applications where it is desired that the composite exhibit a low heat release rate and low total heat release when subjected to combustion conditions including a radiant heat source. Exemplary of such applications are structural panels and laminates used in the interior of airplanes.

The flammability of airline cabin interior materials used in commercial transport aircraft is governed by regulations issued by the Federal Aviation Administratiton (FAA). The FAA requires that all interior materials must be "selfextinguishing" when held in a vertical orientation and subjected to a flame along the bottom edge. It is generally accepted that this vertical flame test addresses the ignitability of a material exposed to a small ignition source (e.g., a condition that might accidentally occur while an aircraft is in flight). Over the past twenty years, for United States air carriers, there has not been a fatal in-flight fire originating in an accessible area of a passenger airplane. Undoubtedly, the selfextinguishing requirements issued by the FAA have contributed to this excellent record. A small number of fire fatalities that do occur in accidents involving U.S. air carriers are the result of post-crash fires, that are often initiated by a large pool of burning aviation fuel.

Airline cabin fire hazards effecting survivability are: flammability of materials, heat release of materials, smoke and toxicity. The relative importance of each of these hazards will depend on the circumstances surrounding any particular accident. For a post-crash cabin fire, a large fuel fire is the most predominant type of ignition source. It has been determined that "flash over" has the greatest bearing on occupant survivability. "Flash over" is the sudden and rapid uncontrolled growth of a fire from the area around the ignition source to the remainder of the cabin interior. Before the onset of flash over, the levels of heat, smoke and toxic gas are clearly tolerable; after the onset of flash over, all the hazards increase rapidly to levels that would make survival very unlikely. Thus, for an intense post-crash fire, the most effective and direct means of minimizing the hazards resulting from burning cabin materials is to delay the onset of flash over. Flammability considerations, in contrast to smoke and toxicity considerations, directly effect the occurrence of flash over.

Airline industry concern has been directed to reducing the flammability and ignitability of composite materials used in the construction of airline interior sidewalls, storage bins, ceilings, and partitions. From a fire safety viewpoint, sidewall panels are an important concern because of their large surface area potentially being involved in a cabin fire.

Fiber composite materials used in the airline industry generally include various epoxy compositions that have been used to impregnate the reinforcing system of fibers. The impregnated system of reinforcing fibers exhibits good adhesion so that they may be easily attached to the core material of the composites. However, the epoxy resins when exposed to flames will burn and produce smoke, conditions that are undesirable for obvious safety reasons. It is possible to impart a self-extinguishing/low flammability property to the epoxy resins by halogenating the epoxy resins. Bromine is a particular halogen which is useful in lowering the flammability of an epoxy resin; however, the bromine does nothing to reduce the level of smoke that is produced when the epoxy resin burns. In fact, the bromination of the epoxy resin may lead to increased levels of smoke production.

Fiber reinforced composites have also been provided by impregnating mats of reinforcing fibers with phenolic resins. These phenolic resins will also burn and produce smoke when exposed to combustion conditions. Further, when the phenolic resins are used, various additives are usually included to impart flexibility to the impregnated fiber composite. These additives, such as nylon and rubber, are additional fuel sources that promote the burning and smoking of the fiber composite when subjected to combustion conditions.

SUMMARY OF THE INVENTION

The present invention is a low heat output composite useful, for example, in non-crush core sandwich panels to be used in the interiors of airplane cabins. The low heat output composite includes reinforcing fibers that are distributed throughout a resin matrix. The resin matrix is a mixture of a major amount of phenolic-based resins and a minor amount of phosphorus-containing polymers. The phosphorus-containing polymer is used in an amount that is effective to cause the low heat output composite to exhibit a heat release rate of less than about 65 kilowatts/m$^2$ when subjected to combustion conditions including a radiant heat source. The phosphorus-containing polymer also causes the low heat output composite to exhibit a total heat release of less than about 65 kilowattminute/m$^2$.

The low heat output composites are useful, for example, in the fabrication of non-crush core sandwich panels to be used in the interiors of transport category airplane cabins that must meet the Federal Aviation Administration rules requiring the heat release rate and total heat release to be below a prescribed upper limit. The low heat output composites provide such a material, that also does not produce life-threatening levels of noxious fumes or smoke when subjected to combustion conditions including a radiant heat source. The low heat output composite is easily fabricated by using conventional processing techniques.

BRIEF DESCRIPTION OF THE DRAWINGS

A complete understanding of the present invention and the objects thereof may be gained from the consideration of the following detailed description of a preferred embodiment, presented hereinbelow in connection with the accompanying figures in which.

DETAILED DESCRIPTION OF THE INVENTION

Figure 1:
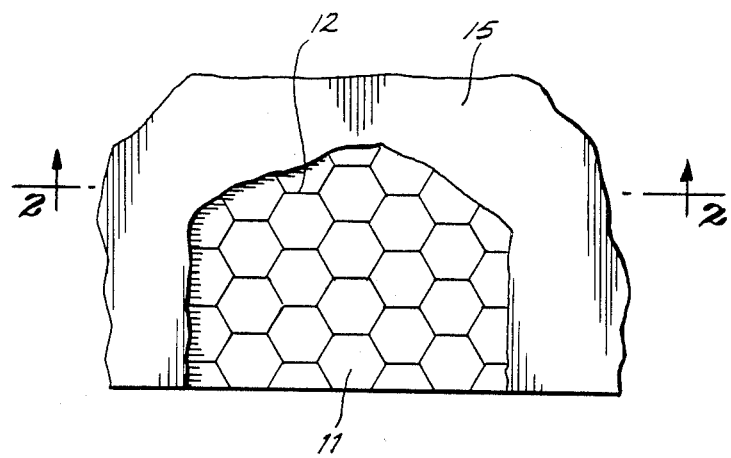
FIG. 1 illustrates a cutaway view of a low heat output composite in accordance with the present invention.

The low heat output composites of the present invention include a core material that provides a strong, preferably lightweight support for reinforcing fibers distributed throughout a resin matrix. The core materials are conventional to the airline industry, and include honeycomb cores of varying thickness and cell shapes and solid cores that find application in the walls, ceilings, partitions, and the like in airplanes. Illustrative of such honeycomb paper cores is a core prepared from paper material available from E. I. duPont de Nemours and Co., Wilmington, Del., under the trade name NOMEX®. The cells of the honeycomb paper core may be of any shape conventionally used in the art. The materials from which these honeycomb cores are produced are preferably fire resistant or inflammable materials that do not contribute to any significant degree to the heat output of the low heat output composite in accordance with the present invention. The reinforcing fibers distributed throughout the resin matrix may also be applied to solid cores where the weight of the panel is not critical or the honeycomb material does not supply the necessary support strength.

The reinforcing fibers that are distributed throughout the resin matrix in accordance with the present invention serve to provide strength to the composite. Examples of suitable reinforcing fibers include fibers of glass, plastic, graphite, KEVLAR®, and mixtures thereof. These fibers are well known in the art and are available from a number of commercial sources. It is understood that the present invention is not limited to any particular types of reinforcing fibers or sources of fibers, and that the materials described above are merely illustrative of fibers known in the art useful as reinforcing systems.

The amount of strength provided by the fibers will depend upon the amount and the particular type of reinforcing fibers utilized as well as the orientation of the fibers in relationship to the stress that the composite will be exposed to. The reinforcing fibers are used in amounts ranging from about 80 weight percent to about 20 weight percent based on the total weight of the reinforcing fibers and resin matrix. Where weight is a prime concern, the reinforcing fibers will be used in an amount that preferably falls near the lower end of the range disclosed. When strength is a prime concern rather than weight, the amount of reinforcing fibers used will generally fall in the upper end of the disclosed range. Depending on the particular application, those skilled in the art will be able to readily determine the preferred amount of reinforcing fibers necessary to provide the desired strength and weight properties. For example, when the composites are used as in the interior of airplanes, and weight is a prime concern, the amount of reinforcing fibers preferably ranges from about 75 weight percent to about 45 weight percent.

Phenolic-based resins useful in the present invention include synthetic thermosetting resins obtained by the acid or alkaline catalyzed condensation of phenol or substituted phenols with aldehydes, such as formaldehyde, acetaldehyde and furfural. The phenolic-based resins are chosen so they can be cured to a solid, infusible matrix surrounding the reinforcing fibers. The phenolic-based resins in their cured phase provide interlaminar bonds and substantial interlaminar strength between adjacent plies of reinforcing fibers, the resins also provide interfiber bonds between adjacent fibers within a ply of the reinforcing fibers. The phenolic-based resins in a partially cured or uncured phase must exhibit an adhesive property that allows the resin matrix including the reinforcing fibers to be applied to and adhered to the support; for example, a honeycomb core material. Particular examples of phenolic-based resins include phenol formaldehyde resole, phenol formaldehyde novolak, phenol acetaldehyde, phenol furfural, and the like. Such resins are commercially available under the trade name CERAC ™ 6010, available from the Chembond Company; BAKELITE ™, available from Union Carbide Corporation; and FIBERITE ™, available from Fiberite Corporation.

The phenolic-based resins may include additives such as rubbers, nylon, and the like to impart a degree of flexibility to the resin. However, it is noted that these additives are a fuel source for combustion and therefore minimal amounts should be used in order to minimize the total amount of fuel available for combustion.

The phenolic-based resin component of the resin matrix is used in an amount that is effective to provide the desired structural integrity and strength to the composite. Generally, the phenolic-based resins are used in a major amount ranging from about 75 pph (parts per hundred) to about 95 pph based on the total weight of the resin matrix; preferably about 82 pph to about 90 pph, and most preferably about 84 pph. The balance of the resin matrix includes a phosphorus-containing polymer.

The phosphorus-containing polymers useful in the present invention are those phosphorus-containing polymers that, when added to the phenolic-based resin to form the resin matrix, cause the low heat output composite to exhibit a heat release rate of less than about 65 kilowatts/$m^2$ when subjected combustion conditions including a radiant heat source. Preferably, the phosphorus-containing polymer causes the low heat output composite to exhibit a heat release rate of less than about 55 kilowatts/$m^2$ and most preferably, less than about 45 kilowatts/$m^2$. The phosphorus-containing polymer also causes the low heat output composite to exhibit a total heat release rate of less than about 65 kilowattminute/$m^2$ preferably, less than about 55 kilowatt-minute/$m^2$ and most preferably, less than about 45 kilowatt-minute/$m^2$.

The phosphorus-containing polymers useful in the present invention are dispersible within the phenolic-based resin described hereinbefore. Because the resin matrix includes both the phenolic-based resin and the phosphorus-containing polymer, in order to obtain the low heat output property of the composite in accordance with the present invention, an even distribution of the phosphorus-containing polymer throughout the resin matrix is important. Therefore, the phosphorus-containing polymer should be dispersible in the phenolic-based resin in an amount that will allow the low heat output composite to exhibit the heat release rate and total heat release described hereinbefore when the resin matrix containing the reinforcing fibers is subjected to combustion conditions including a radiant heat source. It is important that the phosphoruscontaining polymers do not settle out of the resin matrix; otherwise, they will not be uniformly distributed throughout the reinforcing fibers and uneven heat release and total heat release from the composite may result.

In order for the phosphorus-containing polymers to impart the desired heat release rate and total heat release properties to the low heat output composite in accordance with the present invention, the phosphorus-containing polymer should preferably contain at least about 30 weight percent phosphorus-based on the total weight of the polymer. However, other phosphorus containing polymers containing less phosphorus can be used by increasing the total amount of the phosphorus containing polymer in the resin matrix. If the phosphorus containing polymer contains higher levels of phosphorus, smaller amounts of the polymer may be used in the resin matrix to provide an amount of phosphorus in the resin matrix effective to cause the composite to exhibit low heat release properties.

The phosphorus-containing polymers useful in the present invention are represented by the formula:

$$H_{(n-m)+2}(NH_4)_m P_n O_{3n+1}$$

wherein n stands for a whole number with an average value of about 20 to 800 and the ratio m/n is about 1. Examples of such phosphorus-containing polymers include ammonium polyphosphate, and the like. Such phosphorus-containing polymers are available under the trade name PHOS-CHEK ® P/30, available from the Monsanto Company.

The phosphorus-containing polymers are used in a minor amount that causes the low heat output composite, containing the resin matrix including the phosphorus-containing polymer, to exhibit the desired heat release rate and the desired total heat release described hereinabove. Also, the phosphorus-containing polymer should be used in an amount that does not adversely affect, to a substantial degree, the adhesive properties of the partially cured phenolic-based resins that are necessary to bond the resin matrix containing the reinforcing fibers to a support. Generally, the phosphorus-containing polymer is used in a minor amount ranging from about 5 pph to about 25 pph based on the total weight of the resin matrix. Preferably, the phosphorus-containing polymer is used in an amount ranging from about 10 pph to about 18 pph and most preferably, about 16 pph.

The resin matrix containing the phosphorus-containing polymer and the phenolic-based resin is prepared by any means conventionally known in the art for dispersing a powder composition within a liquid resin. For example, the mixture may be formed by physically mixing the phosphorus-containing polymer into the phenolic-based resin at room temperature using a high-speed mixer. The mixing should result in the phosphorus-containing polymer being uniformly dispersed throughout the phenolic-based resin. The uniform dispersion of the phosphoruscontaining polymer in the phenolic-based resin is evidenced by a substantial freedom from agglomeration of the phosphorus-containing polymer and a uniform appearance of the mixture. The present invention is not to be limited to any particular method of mixing the phosphorus-containing polymer and phenolicbased resin.

The reinforcing fibers are advantageously distributed throughout the resin matrix by impregnating a system of the fibers with the resin matrix. The system of reinforcing fibers may be prepared by any method known in the art for producing the same. Examples of such methods include forming a web or mat of the reinforcing fibers. The fibers in the web may all be oriented in the same direction or they may be oriented in differing directions. Examples of particular methods of preparing the reinforcing system of fibers include web-style machines such as spun hand and spun laced methods; air lay machines; direct spray methods; or slurry methods. Systems of reinforcing fibers are commercially available companies such as the International Paper Company. It is to be understood that the present invention is not to be limited to any particular method of preparing the system of reinforcing fibers.

The system of reinforcing fibers can be impregnated by any means known in the art for impregnating reinforcing fiber systems. Examples of such methods include solvent dispersion and hot melt dispersion. Generally, in the solvent dispersion method, the system of reinforcing fibers is passed through a liquid bath of the resin matrix and is then pressed to remove the excess resin matrix. The impregnated system of reinforcing fibers contains about 20 to about 80 wt percent resin matrix based on the total weight of the reinforcing fibers and the resin matrix. In the airline industry applications, the impregnated system of fibers preferably contains about 25 to about 55 wt percent resin matrix. The resin matrix containing the reinforcing fibers is then dried by conventional means such as heat presses or oven drying. This drying process generally results in the partial curing of the phenolic-based resin, resulting in the resin matrix having a tacky surface. The tackiness of the surface allows the matrix to adhere to the underlying support to which the resin matrix containing the reinforcing fibers is applied to form the composite in accordance with the present invention. A more detailed description of particular types of impregnating procedures is found in U.S. Pat. No. 3,658,579. The present invention is not intended to be limited to any particular method of impregnating the system of reinforcing fibers.

The low heat output composites in accordance with the present invention exhibit properties that are desirable for applications requiring low ignitability and low flammability, such as those applications in the interior cabin of airplanes. The low heat output composite of the present invention is formed by adhering any number of layers of the resin matrix containing the reinforcing fibers on a support, such as a honeycomb core. The layers are preferably adhered to both surfaces of the support, thus providing a "sandwich" structure. The "sandwich" structure is then heat pressed to bond the resin matrix containing the reinforcing fibers to the support. A decorative film may be placed over the layer of the resin matrix containing the reinforcing fibers by vacuum pressing methods.

In the application of airline low-heat output composites, the decorative film that is applied to the panel may be of the type conventionally used in the airline industry. Preferably, the decorative film is of the type that itself exhibits a low heat release or low flammability so that full advantage may be taken of the low heat release of the present low heat output composites. Examples of such films include Schneller, Inc. and Polyplastex, Inc. low heat release decorative films available under the trade name AERFILM TM LHR from Schneller, Inc.; and S-3000 from Polyplastex, Inc.

When subjected to combustion conditions, including a radiant heat source, interior airline panels prepared from the composites of the present invention exhibit low heat release rates and low total heat releases that are well within the guidelines promulgated by the Federal Aviation Administration. The panels are not easily ignitable when subjected to combustion conditions and do not exhibit any substantial intumescence that is normally associated with the use of phosphorus-containing polymers in conventional fire retardant systems. Intumescence is defined in *Hackh's Chemical Dictionary* as the swelling of a material upon heating. When subjected to heat, intumescent coatings or materials begin to expand and form a visible carbonaceous char of significant thickness. This char layer adheres to the substrate and expands to many times the original thickness of the intumescent coating. The char layer acts as a thermal insulator and effectively protects the substrate from heat and combustion gases such as oxygen. Although not fully understood, it is believed that the low heat release rates and total heat releases and the lack of intumescent properties of the composites in accordance with the present invention is due to the low levels of phosphorus-containing polymer used in the present invention compared to conventional intumescent phosphorus-containing compositions that use much larger amounts of phosphorus containing materials. These low levels of phosphorus-containing polymer are necessary in order to uniformly disperse the polymer in the phenolic-based resin and maintain the low thixotropic character and adhesive property of the phenolic-based resin component.

Figure 2:
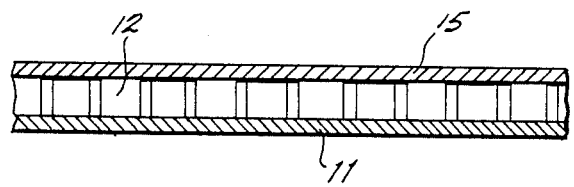
FIG. 2 illustrates a sectional view taken along line 2—2 in FIG. 1 of a low heat output composite in accordance with the present invention.

Referring to FIG. 1, a system of reinforcing fibers 15 distributed throughout a resin matrix containing phenolic-based resin and phosphorus-containing polymer is bonded to a honeycomb core 12. The honeycomb core 12 provides structural strength to the flexible resin matrix containing the reinforcing fibers 15. Further, referring to FIG. 2, the honeycomb core 12 is sandwiched between a first layer 15 of the resin matrix containing the reinforcing fibers and a second layer 11 of the resin matrix and reinforcing fibers. It is also possible that a decorative film (not shown) may be applied to the exterior surfaces of the first layer 15 and/or second layer 11 of the resin matrix.

Although the present invention has been discussed with regard to the preferred embodiment relating to low heat output composites useful in the airline industry, the composites may also be advantageously employed in other industrial applications such as supports for electronic components, such as resistors, capacitors, microchips and the like. Examples of such applications include electronic circuit boards wherein the heat produced by the electronic components or the surrounding environment may cause conventional circuit board materials to combust, thus damaging the surrounding expensive electronic equipment. In applications wherein the composite is used as a support for electronics equipment the amount of reinforcing fibers used will fall in the upper end of the described range.

The following examples are presented to illustrate a preferred embodiment of the present invention and are not intended to limit the scope of the disclosure in any way.

EXAMPLES

A resin matrix containing phenolic-based resin and phosphorus-containing polymer is formed under room conditions by mixing, using conventional means, such as a high-shear blade mixer. The phenolic-based resin is an ammonium polyphosphate available from the Monsanto Company under the trade name PHOSCHECK P/30 ®. Sixteen parts per hundred (pph) of the ammonium polyphosphate are mixed into the phenolic-based resin. The phenolic-based resin is a phenol formaldehyde resin commercially available under the trade name CERAC 6010 ™, available from the Chembond Company. Satisfactory mixing of the ammonium polyphosphate and the phenol formaldehyde resin is evidenced by a substantial freedom of agglomerates of the ammonium polyphosphate and a uniform appearance of the mixture. A system of commercially available reinforcing fibers is impregnated with the resin matrix containing the ammonium polyphosphate and phenol formaldehyde resin. The system of fibers is impregnated by a technique known in the art as solvent dispersion. The system of reinforcing fibers is passed through the resin matrix that has been thinned with an alcohol. As the system of reinforcing fibers exits the liquid resin matrix, it is passed through a press to remove the excess resin matrix. The resin matrix containing the reinforcing fibers is then heated to partially cure and drive off volatiles to provide a flexible resin matrix having a tacky surface and containing a system of reinforcing fibers.

The resin matrix containing the reinforcing fibers is applied to a honeycomb paper core prepared from a commercially available material sold under the trade name NOMEX ®, available from E. I. duPont de Nemours and Co., Wilmington, Del. to provide the low heat output composites. The resin matrix containing the reinforcing fibers is applied to both surfaces of the honeycomb core by a conventional means known as vacuum bag oven curing. The vacuum bag oven curing process further cures the phenolic-based resin component of the resin matrix which causes the resin matrix containing the reinforcing fibers to be adhered to the honeycomb core.

The low heat output sandwich composite is then subjected to a small scale flammability test using a modified version of the rate of heat release apparatus standardized by the American Society of Testing and Materials, ASTM E-906. The modified version known as the Ohio State University (OSU) rate of heat release apparatus is described in the amendment to Appendix F of 14 CFR (Code of Federal Regulations) Part 25 appearing in the Federal Register Vol. 51, No. 139 for Monday, July 21, 1986, pp. 26213–26220, which is expressly incorporated herein by reference. Using the Ohio State University rate of heat release apparatus and method described therein, the heat release rate and total heat release for the low heat output composite is determined for four identical samples (a–d). The results are summarized in Table 1 as Example 1.

EXAMPLE 2

A low heat output composite is prepared in accordance with Example 1. To one surface of the low heat output composite is applied a decorative covering available from Schneller, Inc. under the trade name AERFILM ™ LHR. The decorative film is applied by a conventional means known as vacuum heating. Four identical samples (a–d) of the low heat output composite including the decorative film are subjected to the OSU rate of heat release test procedure described in Example 1. The results are summarized in Table 1 under Example 2.

COMPARATIVE EXAMPLES C-1 and C-2

For comparative purposes only, the procedure for Examples 1 and 2 are repeated with the exception that the system of reinforcing fibers is impregnated with a resin matrix containing only the phenol formaldehyde resin available from the Chembond Company under the trade name CERAC 6010 ™. The panels are subjected to the Ohio State University rate of heat release test and the results are summarized in Table 1 under C-1 and C-2.

TABLE 1

| | | EXAMPLE | | | |
|---|---|---|---|---|---|
| | | 1 | C-1* | 2 | C-2* |
| HEAT RELEASE RATE (kw/m$^2$) | a | 28 | 58 | 42 | 43 |
| | b | 24 | 57 | 47 | 46 |
| | c | 22 | 57 | 44 | 43 |
| | d | 25 | — | 44 | 44 |

TABLE 1-continued

|  |  | EXAMPLE | | | |
| --- | --- | --- | --- | --- | --- |
|  |  | 1 | C-1* | 2 | C-2* |
| TOTAL HEAT | a | 29 | 82 | 49 | 57 |
| RELEASE | b | 21 | 81 | 47 | 58 |
| (kw-min/m$^2$) | c | 24 | 81 | 44 | 59 |
|  | d | 25 | — | 47 | 58 |

*C-1 not an example of the invention.
*C-2 not an example of the invention.

The data illustrate that the composites of Examples 1 and 2 prepared using the resin matrix containing phenol formaldehyde and ammonium polyphosphate exhibit lower levels of heat release rate and total heat release compared to the composites C-1 and C-2 prepared without the ammonium polyphosphate. The composites of the present invention clearly satisfy the Federal Aviation Administration regulations regarding the ignitability and flammability of interior panels used in the interiors of passenger airplanes and can be prepared by methods easily adaptable to existing processes.

While the present invention has been described in conjunction with the preferred embodiments, one of ordinary skill after reading the foregoing specification will be able to effect various changes, substitution of equivalents and other alterations disclosed or set forth herein. It is therefore intended that the protection granted by Letters Patent hereon be limited only by the definition contained in the appended claims and equivalents thereof.

The embodiments of the invention in which an exclusive property or privilege is claimed are defined as follows:

1. A low heat output composite comprising:
   (a) reinforcing fibers distributed throughout a resin matrix, said resin matrix comprising;
   (b) a major amount of phenolic-based resin; and
   (c) a minor amount of phosphorus-containing polymer, said minor amount effective to cause the low heat output composite to exhibit a total heat release of less than about 65 kilowatt-minute/m$^2$ when subjected to combustion conditions including a radiant heat source.

2. The low heat output composite of claim 1, wherein the phosphoruscontaining polymer is used in an amount effective to cause the low heat output composite to exhibit a heat release rate of less than about 65 kilowatts/m$^2$.

3. The low heat output composite of claim 1, wherein the phosphorus-containing polymer contains at least about 30 weight percent phosphorus.

4. The low heat output composite of claim 1, wherein the phosphorus containing polymer is selected from those phosphorus-containing polymers that are dispersible in the phenolic-based resin.

5. The low heat output composite of claim 4, wherein the phosphorus-containing polymer is ammonium polyphosphate.

6. The low heat output composite of claim 5, wherein the phenolic-based resin is selected from the group consisting of phenol-formaldehyde resole resins and phenol-formaldehyde novolak resins.

7. The low heat output composite of claim 6, wherein the resin matrix further comprises the phenolic-based resin in an amount ranging from about 75 pph to about 95 pph and the phosphorus-containing polymer in an amount ranging from about 5 pph to about 25 pph.

8. The low heat output composite of claim 7, wherein the resin matrix further comprises the phenolic-based resin in an amount ranging from about 82 pph to about 90 pph and the phosphorus-containing polymer in an amount ranging from about 10 pph to about 18 pph.

9. The low heat output composite of claim 8, wherein the resin matrix further comprises the phenolic-based resin in an amount of about 84 pph and the phosphorus-containing polymer in an amount of about 16 pph.

10. The low heat output composite of claim 1, wherein the reinforcing fibers are selected from the group consisting of glass fibers, graphite fibers, plastic fibers, aramid fibers and mixtures thereof.

11. The low heat output composie of claim 1, further comprising about 45 to about 75 weight percent reinforcing fibers and about 25 to about 55 weight percent resin matrix.

12. The low heat output composite of claim 1, wherein the resin matrix is non-intumescent.

13. The low heat output composite of claim 1, wherein the heat produced by the radiant heat source is about 3.5 watts/cm$^2$.

14. The low heat output composite of claim 2, wherein the heat release rate is less than about 45 kilowatts/m$^2$.

15. The low heat output composite of claim 14, wherein the total heat release is less than about 45 kilowatt-minute/m$^2$.

16. An airline structural panel comprising the low heat output composite of claim 1.

17. The airline structural panel of claim 16, further comprising a decorative film.

18. An improved airline structural panel comprising a lightweight core material and reinforcing fibers distributed throughout a resin matrix, the resin matrix comprising:
   (a) phenolic-based resin; and
   (b) phosphorus-containing polymer in an amount effective to cause the airline structural panel to exhibit a total heat release of less than about 65 kilowatt-minute/m$^2$.

19. The airline structural panel of claim 18, wherein the phosphoruscontaining polymer is used in an amount effective to cause the airline structural panel to exhibit a heat release rate of less than about 65 kilowatts/m$^2$.

20. The low heat output composite of claim 1, further comprising a lightweight core material.

21. The low heat output composite of claim 20, wherein the lightweight core material contains honeycomb cells.

* * * * *

UNITED STATES PATENT AND TRADEMARK OFFICE
CERTIFICATE OF CORRECTION

PATENT NO. : 4,880,681

DATED : November 14, 1989

INVENTOR(S) : Price et al.

Page 1 of 2

It is certified that error appears in the above-identified patent and that said Letters Patent is hereby corrected as shown below: On the title page

| Column | Line(s) | Error |
|---|---|---|
| Section [75], line 3 | | After "Seattle" and before "," (comma), insert --; Roland E. Kreibich, Auburn-- |
| 1 | 15 & 16 | "Adminis-tratiton" should be --Administration-- |
| 1 | 17 | "selfextinguishing" should be --self-extinguishing-- |
| 1 | 26 | "selfextinguishing" should be --self-extinguishing-- |
| 2 | 33 | "kilowattminute/$m^2$" should be --kilowatt-minute/$m^2$-- |
| 4 | 32 & 33 | "kilowattminute/$m^2$" should be --kilowatt-minute/$m^2$-- |
| 4 | 51 | "phosphoruscontaining" should be --phosphorus-containing-- |
| 5 | 40 | "phosphoruscontaining" should be --phosphorus-containing-- |
| 5 | 45 & 46 | "pheno-licbased" should be --phenolic-based-- |
| 7 | 63 | After "mixture." begin a new paragraph with "A system" |

UNITED STATES PATENT AND TRADEMARK OFFICE
CERTIFICATE OF CORRECTION

PATENT NO. : 4,880,681

DATED : November 14, 1989

INVENTOR(S) : Price, et al

It is certified that error appears in the above-identified patent and that said Letters Patent is hereby corrected as shown below:

Col. 9, line 47      "phosphoruscontaining" should be
Claim 2, line 2     --phosphorus-containing--

Col. 10, line 52     "phosphoruscontaining" should be
Claim 19, line 2     --phosphorus-containing--

Signed and Sealed this

First Day of January, 1991

*Attest:*

HARRY F. MANBECK, JR.

*Attesting Officer*     *Commissioner of Patents and Trademarks*